United States Patent [19]
Braithwaite et al.

[11] Patent Number: 5,949,601
[45] Date of Patent: Sep. 7, 1999

[54] READ/WRITE PROTECT SCHEME FOR A DISK CARTRIDGE AND DRIVE

[75] Inventors: David G. Braithwaite, Layton; Clark C. Bruderer, Farmington; Gregory M. Allen, Layton; David A. Thompson, Ogden, all of Utah

[73] Assignee: Iomega Corporation, Roy, Utah

[21] Appl. No.: 08/884,180

[22] Filed: Jun. 27, 1997

Related U.S. Application Data

[63] Continuation of application No. 08/402,540, Mar. 10, 1995, Pat. No. 5,644,444.

[51] Int. Cl.$^6$ .................................................. G11B 19/04
[52] U.S. Cl. ............................................................ 360/60
[58] Field of Search ............................... 360/60, 133, 69; 380/3, 4; 707/9; 369/275, 2; 386/94

[56] References Cited

U.S. PATENT DOCUMENTS

| | | | |
|---|---|---|---|
| 3,828,327 | 8/1974 | Berglund et al. | 340/172.5 |
| 3,890,601 | 6/1975 | Pietrolewicz | 340/172.5 |
| 4,434,471 | 2/1984 | Hildinger | 364/900 |

(List continued on next page.)

| | | | |
|---|---|---|---|
| 5,557,674 | 9/1996 | Yeow | 380/4 |
| 5,559,993 | 9/1996 | Elliott et al. | 395/490 |
| 5,623,637 | 4/1997 | Jones et al. | 395/491 |
| 5,644,444 | 7/1997 | Braithwaite et al. | 360/60 |
| 5,677,952 | 10/1997 | Blakley, III et al. | 380/4 |
| 5,682,475 | 10/1997 | Johnson et al. | 395/188.01 |

FOREIGN PATENT DOCUMENTS

| | | |
|---|---|---|
| 0 425 125 A2 | 5/1991 | European Pat. Off. . |
| 0 432 333 A1 | 6/1991 | European Pat. Off. . |
| 3512785 A1 | 10/1986 | Germany . |
| 59-175064 | 10/1984 | Japan .................. 360/60 |
| 60-189531 | 9/1985 | Japan . |
| 1-208762 | 8/1989 | Japan . |
| 1-309120 | 12/1989 | Japan . |
| 2230881 | 10/1990 | United Kingdom . |
| WO 91/01065 | 1/1991 | WIPO . |

OTHER PUBLICATIONS

Dryden "Password Utility Locks Disks" (Fifth Generation Systems, Inc., Baton Rouge, LA), *Macintosh News*, p. 28, IDG Communications, Inc., Infoworld, Sep. 4, 1989.

"Disklock" (Fifth Generation Systems, Inc., Baton Rouge, LA) (Advertisement).

"Sentry Software" *Computerworld*, pp. 55 and 56, Jun. 24, 1985. (Article).

"Advanced Security, Disklock, FileGuard" Advanced Gravis Computer Technology, Bellingham WA (Advertisement) (2 pgs.).

European Patent Office Supplementary Search Report, dated Aug. 8, 1997, 4 pages.

Fastlock File Protection System, RUPP Corporation, 1989, N000540–N000546.

(List continued on next page.)

*Primary Examiner*—Aristotelis M. Psitos
*Assistant Examiner*—Alan Faher
*Attorney, Agent, or Firm*—Woodcock Washburn Kurtz Mackiewicz & Norris LLP

[57] ABSTRACT

A method of inhibiting inadvertent and unauthorized writing and reading of information to and from a storage medium comprises the steps of (a) writing a first code in a predetermined location on the storage medium, the first code being indicative of a first protection mode of the storage medium; (b) receiving a command to change the protection mode of the storage medium from the first protection mode to a second protection mode; and, in response to the command, (c) writing in the predetermined location on the storage medium, in place of the first code, a second code indicative of the second protection mode. A protection mode can inhibit writing to the storage medium, both writing and reading to and from the medium, or neither. Changing of protection modes can also be password protected.

37 Claims, 6 Drawing Sheets

U.S. PATENT DOCUMENTS

| | | | |
|---|---|---|---|
| 4,458,315 | 7/1984 | Uchenick | 364/200 |
| 4,460,930 | 7/1984 | Takahashi | 360/60 |
| 4,462,076 | 7/1984 | Smith | 364/200 |
| 4,577,289 | 3/1986 | Comerford et al. | 364/900 |
| 4,593,353 | 6/1986 | Pickholtz | 364/200 |
| 4,606,016 | 8/1986 | Verboom et al. | 369/54 |
| 4,644,493 | 2/1987 | Chandra et al. | 364/900 |
| 4,680,731 | 7/1987 | Izumi et al. | 364/900 |
| 4,734,796 | 3/1988 | Grynberg et al. | 360/60 |
| 4,740,890 | 4/1988 | William | 364/200 |
| 4,748,561 | 5/1988 | Brown | 364/300 |
| 4,757,533 | 7/1988 | Allen et al. | 380/25 |
| 4,785,361 | 11/1988 | Brotby | 360/60 |
| 4,799,635 | 1/1989 | Nakagawa | 364/900 |
| 4,815,032 | 3/1989 | Fujii | 364/900 |
| 4,823,210 | 4/1989 | Bond | 360/60 |
| 4,849,836 | 7/1989 | Kachikian | 360/60 |
| 4,858,036 | 8/1989 | Ginkel | 360/60 |
| 4,860,128 | 8/1989 | Nakagawa | 360/133 |
| 4,864,542 | 9/1989 | Oshima et al. | 365/189.01 |
| 4,865,321 | 9/1989 | Nakagawa et al. | 273/85 |
| 4,866,769 | 9/1989 | Karp | 380/4 |
| 4,903,296 | 2/1990 | Chandra et al. | 380/4 |
| 4,942,606 | 7/1990 | Kaiser et al. | 380/4 |
| 4,947,318 | 8/1990 | Mineo | 364/200 |
| 4,959,860 | 9/1990 | Watters et al. | 380/4 |
| 4,975,898 | 12/1990 | Yoshida | 369/100 |
| 4,980,782 | 12/1990 | Ginkel | 360/60 |
| 4,983,816 | 1/1991 | Iijima | 235/379 |
| 4,984,193 | 1/1991 | Nakagawa | 364/900 |
| 4,984,272 | 1/1991 | McIlroy et al. | 380/25 |
| 4,985,615 | 1/1991 | Iijima | 235/492 |
| 5,012,514 | 4/1991 | Renton | 380/4 |
| 5,027,396 | 6/1991 | Platteter et al. | 380/4 |
| 5,033,084 | 7/1991 | Beecher | 380/4 |
| 5,041,923 | 8/1991 | Iwata et al. | 360/60 |
| 5,042,067 | 8/1991 | Moriyama | 380/25 |
| 5,070,479 | 12/1991 | Nakagawa | 395/575 |
| 5,091,901 | 2/1992 | Yamamoto et al. | 360/60 |
| 5,115,508 | 5/1992 | Hatta | 395/725 |
| 5,119,336 | 6/1992 | Itoh | 365/195 |
| 5,131,091 | 7/1992 | Mizuta | 395/725 |
| 5,132,954 | 7/1992 | Kulakowski et al. | 369/48 |
| 5,134,391 | 7/1992 | Okada | 340/799 |
| 5,144,660 | 9/1992 | Rose | 380/4 |
| 5,155,768 | 10/1992 | Matsuhara | 380/23 |
| 5,161,256 | 11/1992 | Iijima | 902/26 |
| 5,182,680 | 1/1993 | Yamashita et al. | 360/60 |
| 5,184,830 | 2/1993 | Okada et al. | 273/433 |
| 5,185,792 | 2/1993 | Shimada | 380/4 |
| 5,231,546 | 7/1993 | Shimada | 360/60 |
| 5,265,163 | 11/1993 | Golding et al. | 380/25 |
| 5,265,230 | 11/1993 | Saldanha et al. | 395/425 |
| 5,267,311 | 11/1993 | Bakhoum | 380/4 |
| 5,282,247 | 1/1994 | McLean et al. | 380/4 |
| 5,289,540 | 2/1994 | Jones | 380/4 |
| 5,311,498 | 5/1994 | Horiguchi | 369/275.1 |
| 5,369,532 | 11/1994 | Dodt et al. | 360/48 |
| 5,371,792 | 12/1994 | Asai et al. | 380/3 |
| 5,375,243 | 12/1994 | Parzych et al. | 395/725 |
| 5,379,433 | 1/1995 | Yamagishi | 395/725 |
| 5,388,156 | 2/1995 | Blackledge, Jr. et al. | 380/4 |
| 5,418,852 | 5/1995 | Itami et al. | 360/60 |
| 5,434,562 | 7/1995 | Reardon | 340/825.34 |
| 5,453,968 | 9/1995 | Veldhuis et al. | 360/60 |
| 5,454,039 | 9/1995 | Coppersmith et al. | 380/28 |
| 5,475,839 | 12/1995 | Watson et al. | 395/650 |
| 5,535,188 | 7/1996 | Dang et al. | 369/84 |

OTHER PUBLICATIONS

IBM® Corporation, "Preventing Unauthorized Access to Diskette–Loaded Microcode", IBM ® Technical Disclosure Bulletin, vol. 21(2), Jun. 1978, 836–837.

IBM® Corporation, "Data Base Security/Authorization Mechanisms", IBM® Technical Disclosure Bulletin, vol. 28(3), Aug. 1985, 942–947.

Voelcker, J. et al. (Assoc. Eds.), "How disks are 'padlocked'", *IEEE Spectrum*, Jun. 1986, 32–40.

ATA–3 Security Mode Questions, Nov. 16, 1994, 2 pages.

ATA–3 Security Mode Questions, Nov. 23, 1994, 2 pages.

Proposal for adding Security Mode to ATA Specification, Apr. 18, 1994, 8 pages.

ATA Ad Hoc Minutes for Jan. 11–12, 1995, Jan. 16, 1995, 11 pages.

READ/WRITE PROTECT SCHEME FOR A DISK CARTRIDGE AND DRIVE

This is a continuation, of application Ser. No. 08/402,540, filed Mar. 10, 1995, the disclosure of which is herein incorporated by reference, now U.S. Pat. No. 5,644,444.

BACKGROUND

1. Field of the Invention

The present invention relates data storage devices, or disk drives, of the type that receive a removable disk cartridge. More particularly, the present invention relates to a read/write protect method for inhibiting unauthorized and/or inadvertent reading from, and writing to, a storage medium within a disk cartridge.

2. Description of the Prior Art

Removable disk cartridges for storing digital electronic information typically comprise an outer casing or shell that houses a rotatable storage medium, or disk, upon which electronic information can be stored.. The cartridge shell often comprises upper and lower halves that are joined together to house the disk. The disk is mounted on a hub that rotates freely within the cartridge. When the cartridge is inserted into a disk drive, a spindle motor in the drive engages with the disk hub in order to rotate the disk within the cartridge. The outer shell of the cartridge typically has some form of opening near its forward edge to provide the read/write heads of the drive with access to the recording surfaces of the disk. A shutter or door mechanism is often provided to cover the opening when the cartridge is not in use to prevent dust or other contaminants from entering the cartridge and settling on the recording surface of the disk.

Conventional 3.5" floppy disks have a mechanical slider mounted in a corner of the cartridge housing that can be moved from one position to another to indicate whether the floppy disk is, or is not, write-protected. An optical or mechanical switch in a floppy disk drive detects the position of the mechanical slider on the cartridge to determine whether the cartridge is write-protected. If so, the disk drive inhibits writing of information to the storage medium within the floppy disk cartridge. Unfortunately, the mechanical slider on the disk cartridge and the associated mechanical or optical switches in the disk drive increase the costs of the cartridge and drive. Moreover, there is no way to prevent a user from changing the write-protect status of the cartridge. All a user has to do is change the position of the mechanical slider. Another disadvantage of conventional 3.5" floppy disks and their associated drives is that there is no simple way to provide read protection in addition to the write protection. Data encryption can be applied to the recorded information, but data encryption techniques are highly complex and costly to implement.

Saldanha et al., U.S. Pat. No. 5,265,230, and Kulakowski et al., U.S. Pat. No. 5,132,954, disclose data storage systems in which at least a portion of a storage medium can be designated as "read only" by storing a unique data pattern in that portion of the storage medium. However, once a portion of the disk is designated as "read only", the "read only" state is permanent; a user cannot change the state of the "read only" portion of the storage medium.

Horiguchi, U.S. Pat. No. 5,311,498, discloses a method for password protecting one or more data blocks of an optical card. As Horiguchi describes, optical cards and disks are often used to store important information that may need to be protected from unauthorized reading. According to Horiguchi's data security method, at the time the important information is recorded on an optical card or disk, a password is stored in any data blocks that are to be protected from unauthorized reading. Only users who know the stored password can read the information in those data blocks. According to Horiguchi, the password protection is permanent. The password protection cannot be removed, even by a user that knows the current password. The current password also cannot be changed. These limitations are appropriate in Horiguchi's system, because the goal is data security. However, these limitations would be disadvantageous and unworkable in a more flexible read/write protection scheme of the type contemplated herein.

As the foregoing illustrates, there is a need for an improved read/write protection method for inhibiting unauthorized or inadvertent access to the storage medium of a disk cartridge. Preferably, the method would allow both write and read protection to be applied to the storage medium and would allow a user to change the protection mode of the storage medium, if desired. It would also be advantageous if a password could be used, when desired, to prevent unauthorized changes to the protection mode of the storage medium. Preferably, the method would not require additional mechanical or electrical components, nor any physical interaction with the housing of a disk cartridge. The present invention satisfies these needs.

SUMMARY OF THE INVENTION

The present invention is directed to a write/read protect method for inhibiting inadvertent and unauthorized writing and reading of information to and from the storage medium of a disk cartridge. The method of the present invention is primarily intended for use in a disk drive of the type that receives a removable disk cartridge, including a conventional 3.5" floppy disk drive or any other magnetic, optical, magneto-optical or other hard or floppy disk drive that receives removable cartridges. The present invention can also be employed in fixed, or rigid type hard drives.

According to the present invention, a first predetermined location is provided on a storage medium for writing, or storing, a code indicative of, or having a value indicative of, a protection mode of the storage medium. A second predetermined location may also be provided on the storage medium for storing, if desired, a password associated with the code. Possible protection modes include, but are not limited to, a protection mode wherein writing of information to the storage medium is inhibited, a protection mode wherein writing and reading of information to and from the storage medium are not inhibited, and a protection mode wherein both writing and reading of information to and from the storage medium are inhibited. Essentially, each protection mode specifies one of a number of different ways in which access to the storage medium may be inhibited. Whenever access to the storage medium is attempted in a manner that is inhibited by the protection mode of the storage medium, the disk drive preferably will report an error.

Further according to the present invention, a current, or first protection mode indicated by a first code stored in the first predetermined location on the storage medium is changed by (a) receiving a command to change the protection mode of the storage medium from the first protection mode to a second protection mode; and, in response to the command, (c) writing in the first predetermined location on the storage medium, in place of the first code, a second code indicative of the second protection mode.

A password can be written to the second predetermined location on the storage medium in connection with certain protection modes. In such a case, a command to change the protection mode of the storage medium will only be executed if a password received with the command matches the password written in the second predetermined location on said storage medium.

According to another aspect of the present invention, the method may further comprise the steps of (i) reading a first, or initial code written in the first predetermined location on the storage medium upon insertion of the storage medium into the disk drive; (ii) determining from the first code the first protection mode of said storage medium; and (iii) setting at least one flag to indicate the first protection mode of the storage medium. The method of the present invention may still further comprise the steps of (i) receiving a command to temporarily by-pass the protection mode indicated by the code written in the predetermined location on the storage medium; and, in response thereto, (ii) resetting the aforementioned flag(s) to a state that indicates that access to the storage medium is not inhibited. In this mode of operation, a disk drive can access the storage medium in a manner that would otherwise be inhibited by the protection mode indicated by the code on the storage medium, but without having to overwrite that code.

A disk cartridge according to the present invention comprises a storage medium having a plurality of concentric tracks to and from which information may be written and read. The storage medium has written, in a first predetermined location thereon, a code that indicates a protection mode of said storage medium, and has written, in a second predetermined location thereon, a password associated with said code. A disk drive cannot write another code in place of the code written in said first predetermined location unless a password received by the disk drive matches the password written in said second predetermined location. Preferably, the first and second predetermined locations are duplicated at a plurality of positions on said storage medium and on opposite surfaces of said storage medium. Preferably, the first and second predetermined locations are not accessible by a user's host computer. Only a disk drive according to the present invention can access those locations. The storage medium may comprise any form of rewritable storage media, including, but not limited to magnetic storage media, rewritable optical media and magnetooptical media.

The foregoing and other objects, features and advantages of the invention will become evident hereinafter.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF THE PREFERRED EMBODIMENTS

Figure 1:
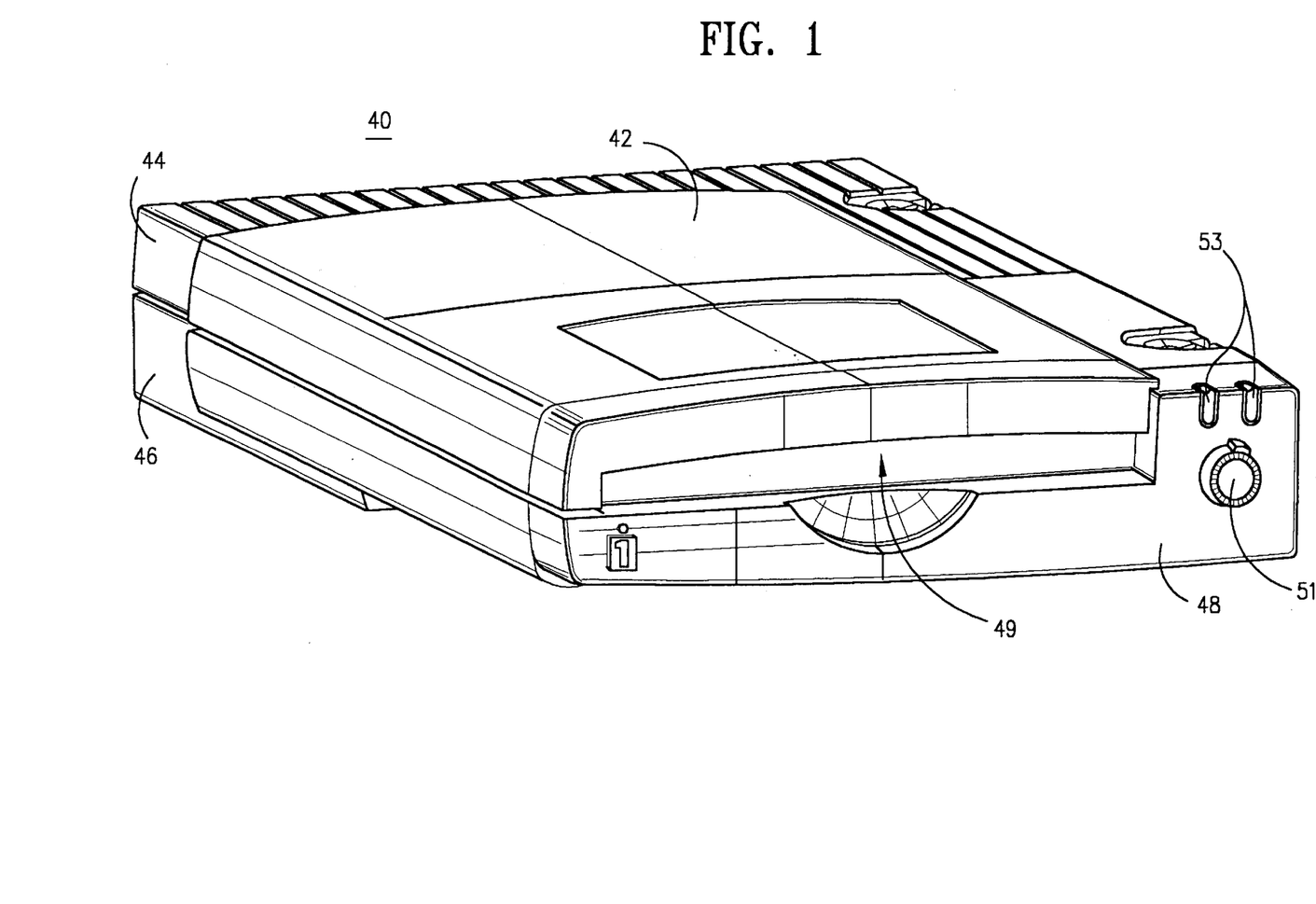
FIG. 1 is a perspective view of a data storage device, or disk drive, in which the present invention is embodied.

Referring to the drawings wherein like numerals indicate like elements throughout, there is shown in FIG. 1 a data storage device, or disk drive 40, in which the present invention may be employed. As shown, the disk drive 40 comprises an outer housing 42 having top and bottom covers 44, 46 and a front panel 48. A disk cartridge can be inserted into the disk drive 40 through a horizontal opening 49 in the front panel 48 of the disk drive 40. A user-interface of the disk drive 40 comprises an eject button 51 for automatically ejecting a disk cartridge from the disk drive 40, and a plurality of drive status indicators 53 for indicating that the drive has power and for indicating that the drive is accessing a storage medium within the disk cartridge. As used herein and in the claims, the terms "access" and "accessing" means either writing to or reading from a storage medium, or both. In the present embodiment, the disk drive 40 is intended to interface with a host computer (not shown) and can be employed as a stand-alone unit, or alternatively, can be installed in an internal bay (not shown) of the host computer (not shown).

Figure 2:
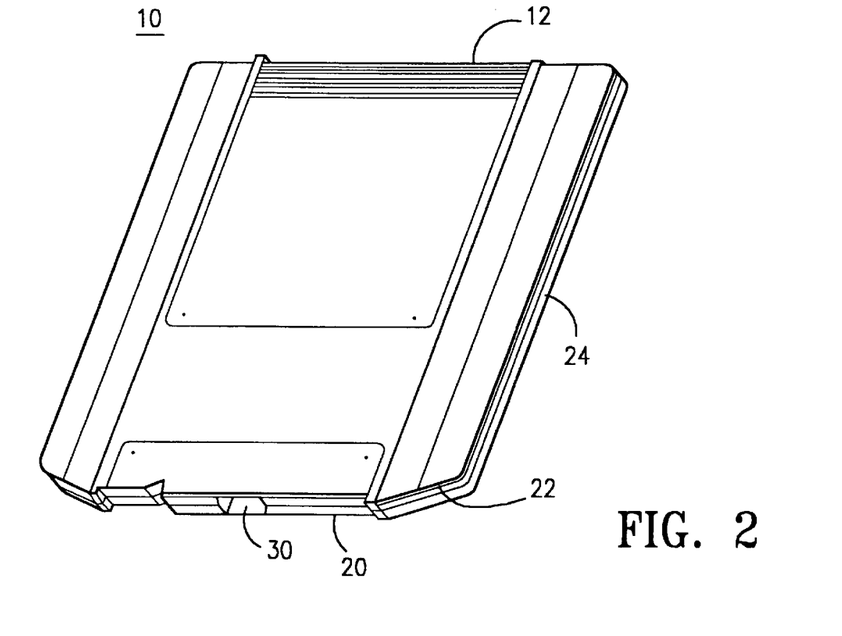
FIG. 2 is a perspective view of a disk cartridge for use with the disk drive of the FIG. 1.
Figure 3:
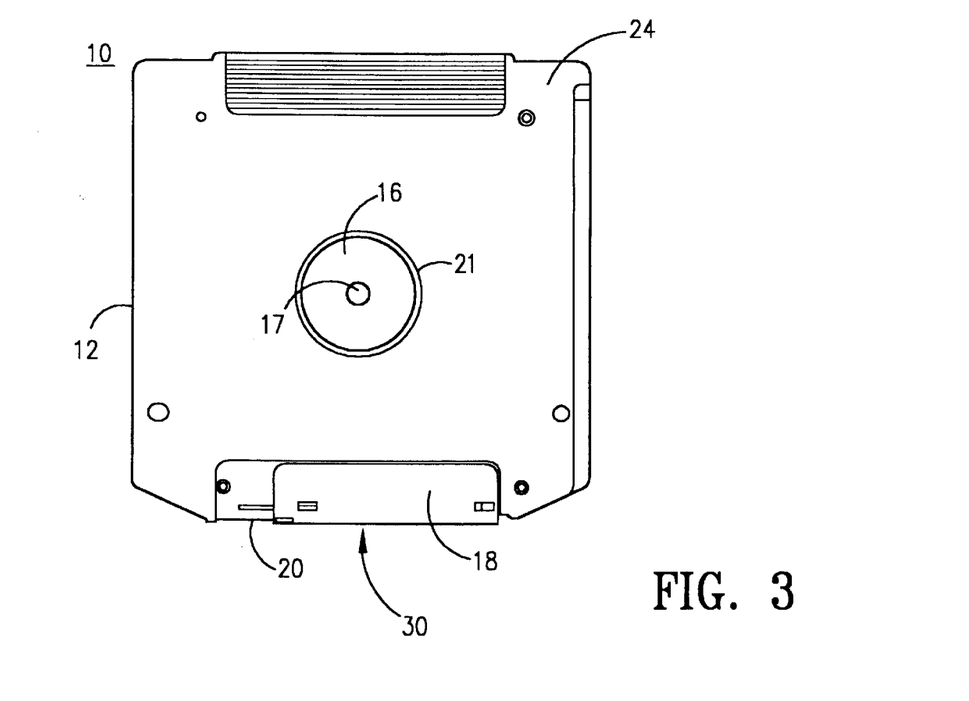
FIG. 3 is a bottom view of the disk cartridge of FIG. 2.

FIGS. 2 and 3 show an exemplary disk cartridge 10 that can be inserted into the disk drive 40 of FIG. 1. As shown, the disk cartridge 10 comprises an outer casing 12 having upper and lower shells 22, 24 that mate to form the casing. A disk-shaped storage medium described hereinafter is affixed to a hub 16 that is rotatably mounted within the casing 12. An opening 21 on the bottom shell 24 of the casing 12 provides access to the disk hub 16. A head access opening 30 in the front peripheral edge 20 of the disk cartridge 10 provides access to the surfaces of the storage medium by the read/write heads of the disk drive 40. A shutter 18 (not shown in FIG. 2) is provided on the front peripheral edge 20 of the disk cartridge 10 to cover the head access opening 30 when the cartridge 10 is not in use. When the cartridge is inserted into the disk drive 40, the shutter 18 moves to the side exposing the head access opening 30 and thereby providing the read/write heads of the drive with access to the storage medium within the disk cartridge.

Figure 4:
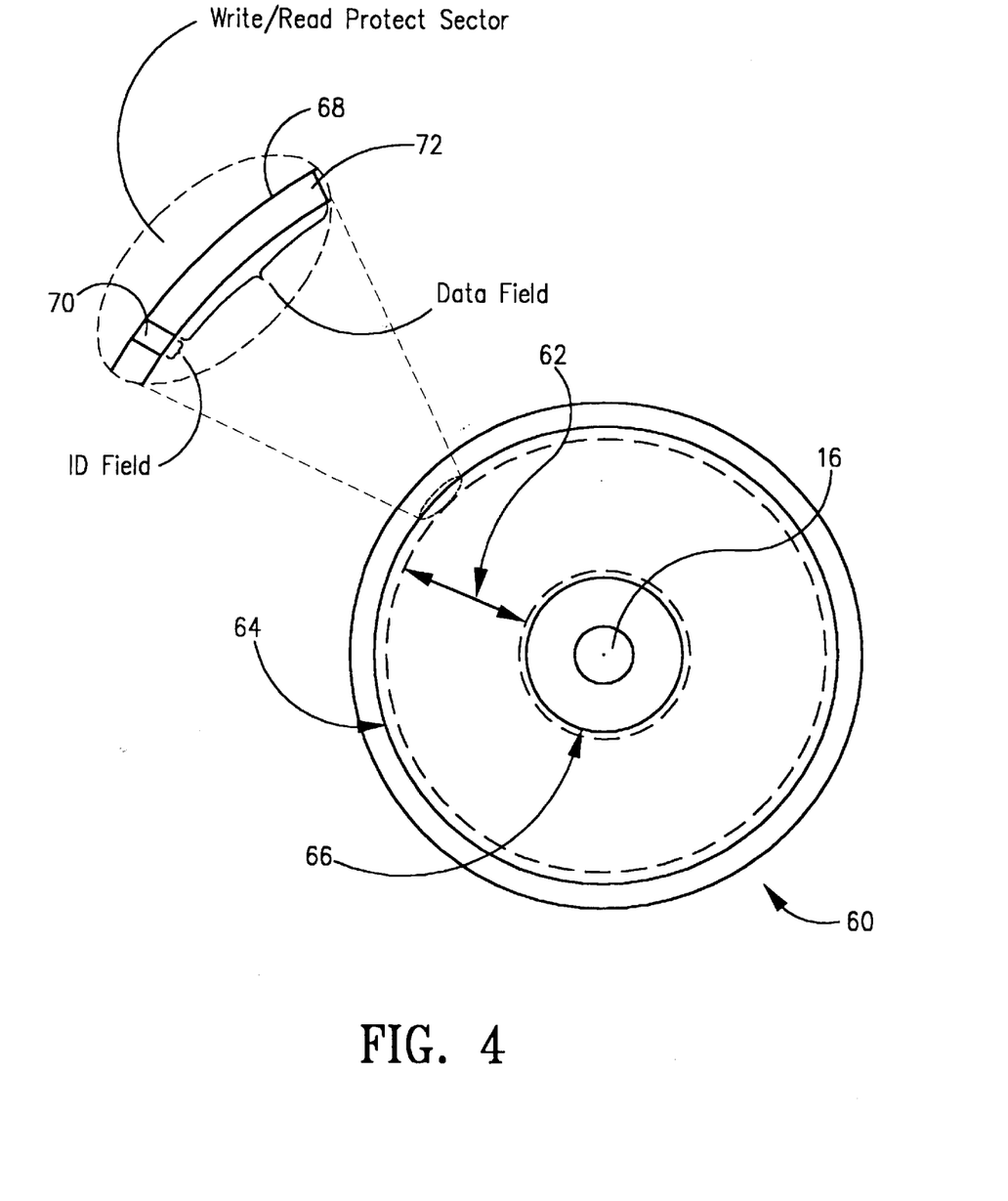
FIG. 4 shows a disk-shaped storage medium in accordance with a preferred embodiment of the present invention that may be contained within the disk cartridge of FIGS. 2 and 3.

FIG. 4 shows a disk-shaped storage medium 60 in accordance with a preferred embodiment of the present invention. In the preferred embodiment, the storage medium 60 comprises a disk having a magnetic coating for writing and reading information to and from the storage medium 60. Preferably, information can be written on both sides of the storage medium 60. While magnetic media is preferred, other media can be employed, and the present invention is by no means limited to use of magnetic storage media. For example, the storage medium 60 can be a rewritable optical storage medium or a magneto-optical storage medium.

In the preferred embodiment, the storage medium has a band of approximately 1800 concentric data tracks 62 which can be written to, and read from, by a user's host computer. Other track densities can be employed, however. In addition to the data tracks 62, there are two tracks 64, 66 on each side of the storage medium (only one side shown in FIG. 4) that contain special information pertaining to the defect characteristics of that particular storage medium. The information contained on these four tracks (two per side) is identical and, in fact, is repeated in two separate locations on each track 64, 66. This redundancy is necessary to ensure that the information is always available, even if some areas of the storage medium become damaged and unreadable. On each side of the storage medium 60, one of these special information tracks, i.e., track 64, is located at the outside of the band of data tracks 62, and the other special information track 66 is located to the inside of the band of data tracks 62. None of the four special information tracks 64, 66 can be accessed by a host computer (not shown) to which the disk drive 40 is interfaced. Only the disk drive 40, and in particular, a microprocessor within the disk drive 40, can access the information written on these tracks 64, 66.

According to the present invention, a first predetermined location is provided on the storage medium 60 for writing, or storing, a code having a value indicative of a protection mode of the storage medium. A second predetermined location is provided on the storage medium 60 for storing, if desired, a password associated with the code. In the present embodiment, the storage medium 60 can be subjected to one of four different protection modes. Each protection mode specifies a different way in which access to the data tracks 62 of the storage medium 60, i.e., writing and reading of information to and from the data tracks 62, may be inhibited. In the present embodiment, the four possible protection modes of a storage medium are:

1) Unlock Mode: neither writing, nor reading of information to and from the storage medium is inhibited; the storage medium has no read or write protection. A password is not required to change from this mode.
2) Write Protect Mode: writing of information to the storage medium is inhibited, i.e., the storage medium is write-protected. A password is not required to change from this mode.
3) Password Write Protect Mode: writing of information to the storage medium is inhibited, i.e., the storage medium is write-protected. A password is required to change from this mode.
4) Read/Write Protect Mode: both writing and reading of information to and from the storage medium are inhibited, i.e., the storage medium is both write- and read-protected. A password is required to change from this mode.

In the present embodiment, the following code values are assigned to represent each of these protection modes:

| CODE VALUE (binary) | PROTECTION MODE |
| --- | --- |
| 0000 0000 | Unlock Mode |
| 0000 0010 | Write Protect Mode |
| 0000 0011 | Password Write Protect Mode |
| 0000 0101 | Read/Write Protect Mode |

As described hereinafter, in addition to the four protection modes that can be applied to the storage medium, a "Temporary Unlock Mode", or command, can be applied to the disk drive 40 to effectively override the protection mode of the storage medium specified by the code written in the first predetermined location on the storage medium.

Referring still to FIG. 4, in accordance with the preferred embodiment of the present invention, at least the outer special information track 64 on at least one side of the storage medium includes at least one write/read protect sector 68 that comprises an ID field 70 and a data field 72. The ID field 70 is used to identify the write/read protect sector 68 and to distinguish that sector from other sectors in the special information track 64. In the preferred embodiment, the data field 72 comprises 512 bytes, however, in other embodiments, the data field 72 may comprise a different number of bytes.

A first portion of the data field 72 of the write/read protect sector 68 is used for writing, or storing, one of the aforementioned codes on the storage medium to indicate the current protection mode of the storage medium 60. This first portion of the write/read protect sector 68 defines the first predetermined location referred to above and in the claims. A second portion of the data field 72 of the write/read protect sector 68 is used for writing, or storing, a password on the storage medium 60. This second portion of the write/read protect sector 68 defines the second pre-determined location referred to above and in the claims. Preferably, the content and arrangement of the data field 72 is as follows:

| BYTE # | Description |
| --- | --- |
| 0 | Vendor Unique |
| 1 | Code indicating current protection mode of storage medium |
| 2 | Password Length |
| 3–34 | Password in ASCII Characters |
| 35–511 | Unused |

As shown, byte "0" of the data field 72 is used to provide a unique identifier of the vendor of the storage medium 60 and/or disk cartridge 10. Byte "1" is used to store one of the aforementioned codes in order to indicate the current protection mode applied to the storage medium 60. Bytes "3" through "34" hold the ASCII character representation of the password, if any, currently in effect. Byte "2" specifies the password length, in bytes. The password is used to prevent unauthorized changing of the protection mode specified by the code stored in byte "1", i.e., to prevent a new code from being written in place of the current code to which the password is associated. Finally, bytes "35" through "511" of the write/read protect sector 68 are unused in connection with the read/write protect scheme of the present invention.

For purposes of redundancy, like the defect information described above, the write/read protect sector 68 is duplicated twice in each of the special information tracks 64, 66 on each side of the storage medium 60. This provides a total of eight identical write/read protect sectors 68 on the storage medium. The disk drive 40 can access any one of these eight duplicate write/read protect sectors 68 to determine the current protection mode of the storage medium, as well as to determined the current password, if any, associated with that protection mode. This redundancy is necessary to ensure that the code and password of the current protection mode can be ascertained, even if some areas of the storage medium 60 become damaged and unreadable. Since the duplicate write/read protect sectors 68 are provided in respective ones of the special information tracks 64, 66, those sectors, like the remainder of each special information track 64, 66 are not accessible by the host computer to which the disk drive 40 is interfaced. Only the disk drive 40 can access the write/read protect sectors on the storage medium.

Figure 5:
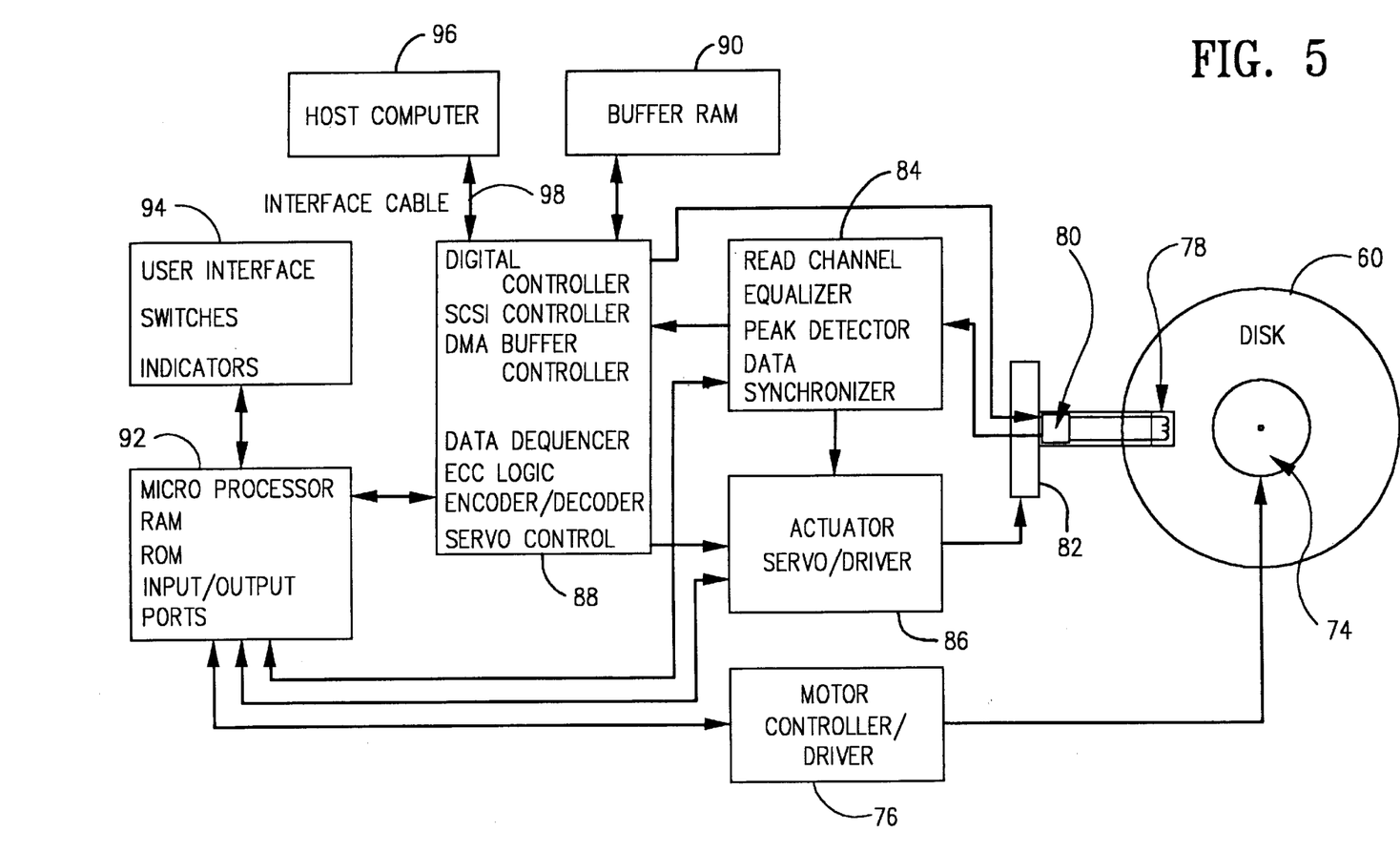
FIG. 5 is a block diagram illustrating further details of the disk drive of FIG. 1 in accordance with a preferred embodiment of the present invention.

FIG. 5 is a block diagram of the disk drive 40 in accordance with a preferred embodiment of the present invention. As shown, the disk drive 40 comprises a spindle motor 74, motor controller/driver 76, read/write heads 78, read/write preamp 80, read channel 84, actuator 82, actuator servo/driver 86, digital controller 88, random-access memory buffer 90, microprocessor 92 and user interface components 94, which include the status indicators 53 and ejection button 51 on the front panel 48 of the disk drive 40. The disk drive 40 connects to a user's host computer 96 through an interface cable 98.

The motor controller/driver 76 and spindle motor 74 rotate the storage medium 60 at a constant speed, allowing the read/write heads 78 to "fly" close to the rotating storage medium 60 for a stable recording environment. The motor controller/driver 76 can be implemented, at least in part, with the 8902 series motor controller/driver available from Allegro MicroSystems, Inc., 115 Northeast Cutoff, Worcester, Mass. 01615.

The read/write preamp 80 amplifies the signals picked up by the heads 78 during read operations and switches current in the heads 78 during write operations. The read channel 84 shapes the pulses from the preamp, qualifies the peaks that represent the user data and special information, and generates a clock that is synchronous with the RLL (run length limited) data coming off the storage medium. The read channel 84 may be implemented, at least in part, with the AD899 series read channel electronics available from Analog Devices, One Technology Way, Norwood, Mass. 01062.

Preferably, the actuator 82 comprises a linear actuator, although the present invention is by no means limited thereto. For example, a radial arm voice coil actuator can also be employed. U.S. application Ser. No. 08/727,128 filed Oct. 8, 1996, entitled "Actuator For Data Storage Device" (which is a continuation of U.S. application Ser. No. 08/526,577, filed Sep. 11, 1996, now abandoned, which was a continuation of U.S. application Ser. No. 08/324,599, filed Oct. 18, 1994, now abandoned), incorporated herein by reference, describes a suitable linear actuator that can be employed in the disk drive 40.

The actuator servo/driver 86 demodulates servo information recorded on the storage medium and compensates to position the read/write heads 78 precisely on a selected track of the data storage medium 60. The actuator servo/driver 86 can be implemented, at least in part, with the 8932-A series driver available from Allegro MicroSystems, Inc., 115 Northeast Cutoff, Worcester, Mass. 01615.

The digital controller 88 decodes and error checks the data from the read channel 84 and stores the data temporarily in a buffer RAM. The controller 88 also makes sure that data is written to, or read from, the correct track and sector of the storage medium 60. The controller 88, when directed by the microprocessor 92, sends data from the buffer 90 to the host computer 96, or from the host computer 96 to the buffer 90, in accordance with a SCSI protocol. The digital controller 88 also generates servo control signals. The digital controller 88 can be implemented using the AIC-7110 High-Performance Integrated SCSI Mass Storage Controller available from Adaptec, 691 South Milpitas Blvd., Milpitas, Calif. 95035.

The microprocessor 92 controls and monitors all functions in the drive. The program code is stored in a Read-Only Memory ("ROM"), while a RAM is used for storing variables, flags, status information, etc. As described hereinafter in greater detail, the microprocessor 92 is responsible, in large part, for performing the steps of the method of the present invention. A significant function of the microprocessor 92 is to control access, i.e. reading and writing, to the storage medium 60 in accordance with the protection mode indicated by the code stored, or written, in the first predetermined location on the storage medium, i.e., the code written in byte "1" of the data field 72 of each of the eight duplicate write/read protect sectors 68. Any suitable microprocessor can be employed, such as, for example, a Motorola 68HC16 microprocessor or an Intel 8032 microprocessor.

According to the present invention, the current protection mode of a storage medium 60 can be selected by a user of the host computer 96 at any time and can likewise be changed by the user at any time. Changing or setting the protection mode of a storage medium in accordance with the present invention is achieved by sending an appropriate "protection mode command" from the host computer 96 to the disk drive 40. In the preferred embodiment, the protection mode command has the following content and arrangement:

| Byte | Bit | | | | | | | |
|---|---|---|---|---|---|---|---|---|
| | 7 | 6 | 5 | 4 | 3 | 2 | 1 | 0 |
| 0 | Operation Code (0Ch) | | | | | | | |
| 1 | Protection Mode Code | | | | | | | |
| 2–3 | Reserved | | | | | | | |
| 4 | Password Length (0–32 characters) | | | | | | | |
| 5 | Control Byte (00h) | | | | | | | |

The protection mode command comprises six bytes. The Operation Code ("OpCode") of the protection mode command occupies the first byte, i.e., byte "0", of the command. In the present embodiment, the OpCode for the protection mode command is 0C hex. Byte "1" of the command contains the code value indicative of the desired protection mode. Bytes "2" and "3" are reserved. Byte "5" is a control byte that, in the present embodiment, has a value of 00h.

Byte "4" of the protection mode command specifies the length, in bytes, of any password sent by the host computer 96 immediately following the protection mode command. The maximum length of a password is 32 bytes. Any byte value from 00h to FFh is acceptable as a valid password character. When a protection mode that uses password protection is invoked, the password bytes are written into the second pre-determined location on the storage medium, i.e., bytes 3–34 of the data field 72 of each of the duplicate write/read protect sectors 68. The password remains in effect until the protection mode is changed—using the protection mode command to invoke a different protection mode—or until the storage medium is reformatted. When changing from a protection mode that has password protection, the password sent with the protection mode command must identically match the password written in the second pre-determined location on the storage medium. Otherwise, the protection mode command attempting to change the current protection mode will be rejected. Formatting the storage medium 60 allows the media to be recovered if the password is forgotten, but any stored data will be lost. A storage medium that is in the Read/Write Protect Mode will require that the format overwrite every host accessible sector on the storage medium before removing or allowing any change to that protection mode.

In the preferred embodiment, the protection mode applies to the entire volume of information in the data tracks 62 on both sides of the storage medium. In other embodiments, however, provision may be made for protecting individual sectors or groups of sectors anywhere on the storage medium. Such an embodiment would require a separate code and password for each such individual sector or group of sectors.

As described hereinafter, the microprocessor 92 (FIG. 5) is responsible for executing the protection mode command and for ensuring that the code value indicative of a desired protection mode and any password associated therewith are written to the storage medium. When a protection mode command attempts to change from a protection mode that is password protected, the microprocessor 92 compares the password sent from the host computer 96 with the password written in the duplicate write/read protect sectors 68 on the storage medium. If the password sent from the host computer 96 does not match the password written on the storage medium 60, the microprocessor will prevent any change in the protection mode. The microprocessor 92 is also responsible for inhibiting writing of information from the host computer to the data tracks 62 of the storage medium 60 when the current protection mode of the storage medium, as indicated by the code value written in the first predetermined location thereof, is either the Write-Protect Mode, Password Write Protect Mode or Read/Write Protect Mode. When the current protection mode is the Read/Write Protect Mode, the microprocessor 92 will also inhibit reading of information from the data storage medium.

The protection mode command described above can also be used to put the disk drive 40 in a Temporary Unlock Mode. In the present embodiment, this is accomplished by sending the protection mode command with a code value of "0000 1xxx", where "x" indicates either a "1" or "0". Upon receiving a protection mode command having this code value, the microprocessor 92 will temporarily disable all read and write protection for the storage medium until either the current disk cartridge is removed from the disk drive, or power to the drive is turned off. The Temporary Unlock Mode does not change or affect the code value and password, if any, stored in the first and second predetermined locations on the storage medium. Removal of a disk cartridge after entering the Temporary Unlock Mode will leave the protection mode of the cartridge intact, and that protection mode will be in effect the next time the cartridge is inserted into the drive. When attempting to enter the Temporary Unlock Mode from a protection mode that is password protected, the protection mode command sent by the host computer 96 must, as for any change from a password-protected mode, be followed by the identical password stored in the second predetermined location on the storage medium.

Figure 6A:
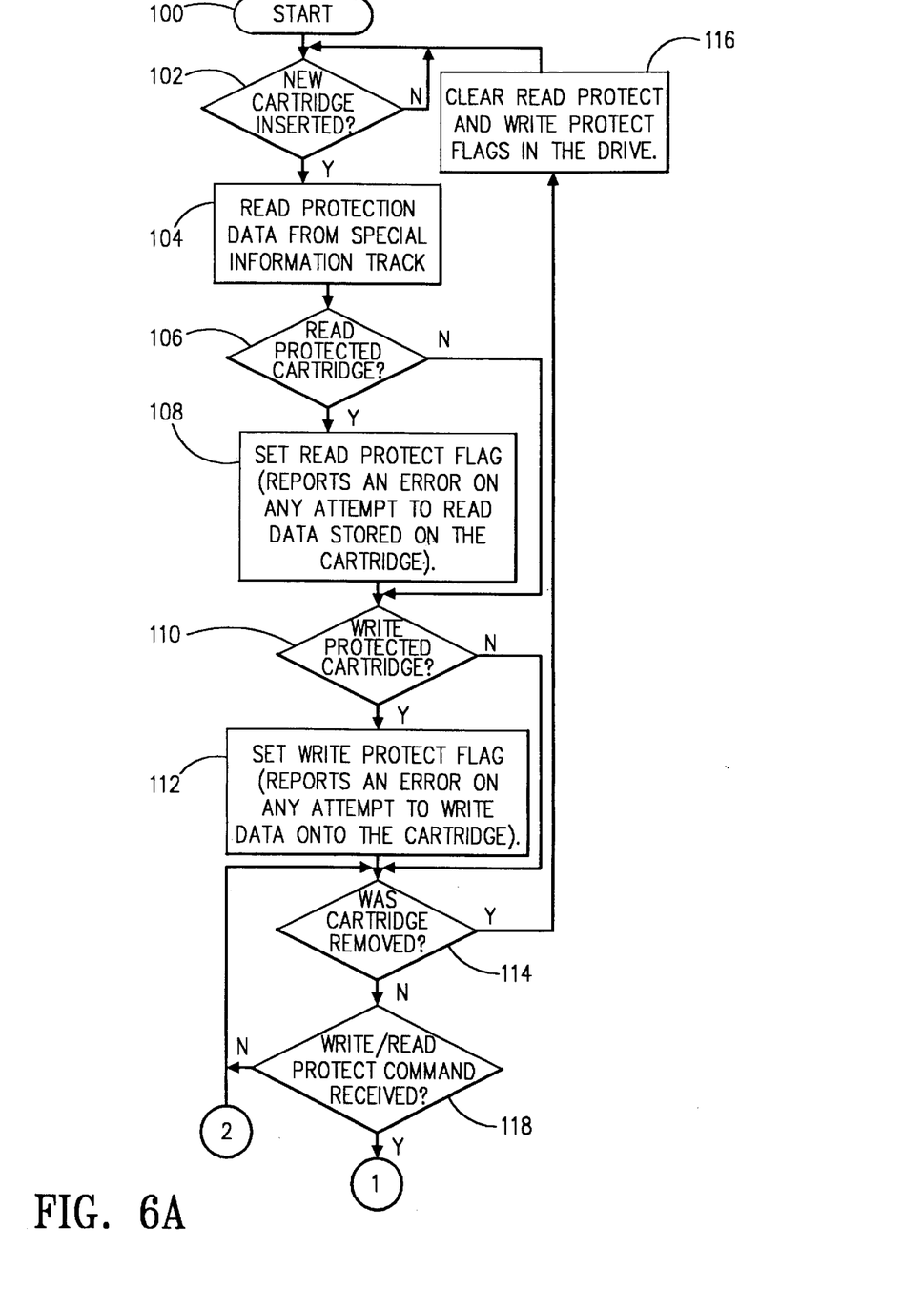
FIG. 6 is a flow diagram illustrating both the operation of the disk drive of FIG. 5 and a preferred embodiment of a method of the present invention.
Figure 6B:
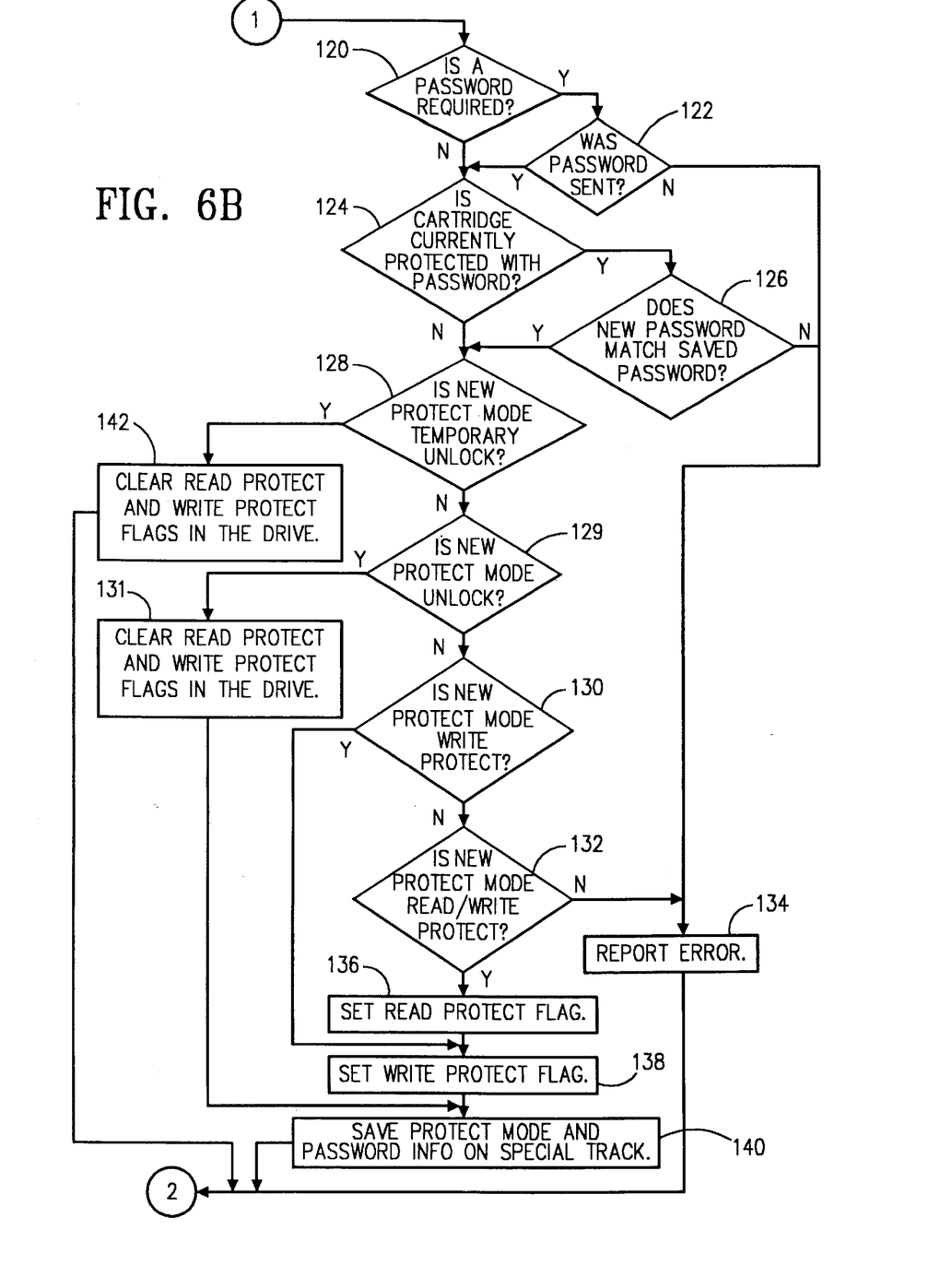

FIG. 6 is flow diagram illustrating both the operation of the disk drive 40 of FIG. 5, particularly microprocessor 92, and a preferred embodiment of the method of the present invention. Upon power-up of the disk drive 40, the microprocessor 92 waits at step 102 until the insertion of a disk cartridge into the disk drive 40 is detected. Preferably, detection of a disk cartridge is achieved in accordance with the methods and apparatus described in co-pending application Ser. No. 08/337,678, filed Nov. 10, 1994, entitled "Disk Cartridge Detection Methods and Apparatus" (the Issue Fee of which was paid on Jan. 30, 1998). When the insertion of a disk cartridge into the disk drive 40 is detected, control passes to step 104.

At step 104, the microprocessor 92 reads the code value and password, if any, stored in the first and second predetermined locations on the storage medium 60, i.e., bytes 1 and 3–34 of the data field 72 of at least one of the eight duplicate write/read protect sectors 68. At this point, the code value read from the storage medium defines a first, or initial code, and indicates the first, or initial, protection mode of the storage device.

Next, at step 106, the microprocessor 92 examines the first code to determine whether the storage medium is read protected, which in the present embodiment, only applies when the protection mode of the storage medium is the Read/Write Protect Mode. If the first code indicates that the storage medium is read protected, i.e., the storage medium is in the Read/Write Protect Mode, then control passes to step 108 where the microprocessor 92 sets an internal "read protect" flag to indicate that the storage medium is read protected. The microprocessor 92 thereafter inhibits any attempt by the user's host computer to read information from the storage medium 60. Any such attempt results in an error message being sent to the host computer.

If, on the other hand, the microprocessor 92 determines in step 106 that the storage medium is not read protected, control passes directly to step 110. At step 110, the microprocessor 92 examines the first code to determine whether the storage medium is any of the modes that provide write protection, i.e., the Write Protect Mode, the Password Write Protect Mode or the Read/Write Protect Mode. If the first code represents either of these modes, then control passes to step 112 where the microprocessor 92 sets an internal "write protect" flag to indicate that the storage medium 60 is write protected. The microprocessor 92 thereafter inhibits any attempt by the user's host computer to write information to the storage medium 60. Any such attempt results in an error message being sent to the host computer.

If, on the other hand, the microprocessor 92 determines in step 110 that the storage medium 60 is not write protected, then control passes directly to step 114. At step 114, the microprocessor 92 determines whether the current disk cartridge has been removed from the disk drive 40. If not, control passes to step 118 where the microprocessor 92 inquires whether a protection mode command has been received from the host computer 96. If not, control passes back to step 114. Normal operation of the disk drive 40 can then proceed. The microprocessor periodically will perform steps 114 and 118. Normal operation will continue until either the current disk cartridge is removed (step 114), or a protection mode command is received from the host computer requesting a change in the protection mode of the storage medium (step 118).

If the current disk cartridge is removed from the disk drive 40, control passes to step 116 where the read and write protect flags are cleared. Control then passes back to step 102 where the microprocessor waits for a new disk cartridge to be inserted. Upon insertion of a new disk cartridge, control will once again pass to step 104, and the microprocessor 92 will operate on the new disk cartridge in the manner described above.

If, however, the current disk cartridge is not removed, but a protection mode command is received from the host computer 96, control will pass from step 118 to step 120. At step 120, the microprocessor 92 determines whether a password should have been sent with the protection mode command either (i) because the new protection mode to be established is one of the password-protected modes, e.g., the Password Write Protect Mode or the Read/Write Protect Mode, or (ii) because the current protection mode is one of the password protected modes and thus requires a password to change from that mode. If, for either of these reasons, the new protection mode does require a password, control passes to step 122 where the microprocessor determines whether a password was sent immediately following the protection mode command. If not, control passes to step 134 where an error is reported. Control will then pass from step 134 back to step 114.

If at step 122 it is determined that the required password was sent, then control passes to step 124. Control will also pass to step 124 if it is determined at step 120 that a password is not required. At this point, the new code value in the protection mode command defines a second code, and the new protection mode specified by that second code defines a second protection mode.

At step 124, the microprocessor 92 examines the first code, which is still stored in the first predetermined location on the storage medium, to determine if the first, or current, protection mode requires a password before a change in protection mode can be effected. If a password is required to change from the current protection mode, control passes to step 126 where the microprocessor compares the password that accompanied the protection mode command with the current password read from the second predetermined location on the storage medium. If these passwords do not match identically, then control passes from step 126 to step 134 where an appropriate error is reported. Control then passes from step 134 back to step 114.

If the microprocessor 92 determines at step 126 that the two passwords do match, or if the microprocessor 92 determines at step 124 that there is no password associated with the current protection mode (i.e., the current protection mode is either the Unlock Mode or the Write Protect Mode), then control passes to step 128.

At step 128, the microprocessor 92 determines whether the second code transmitted in the protection mode command represents the Temporary Unlock Mode. If the second code does not represent the Temporary Unlock Mode, then control passes to step 129. At step 129, the microprocessor 92 examines the new, or second code, is the code for the Unlock Mode. If so, control passes to step 131 where the read protect and write protect flags are cleared in accordance with the Unlock Mode. Control then passes to step 140 where the new, or second code, representing the Unlock Mode is written to the first predetermined location on the storage medium in place of the first code. Information may also be stored in the second predetermined location to indicate that no password is provided with this protection mode. At this point, the change from the first protection mode to the second protection mode has been effected. Control will then pass back to step 114.

If at step 129, it is determined that the second code is not the code for the Unlock Mode, then control will pass to step 130. At step 130, the microprocessor determines whether the second code is the code for either the Write Protect Mode or the Password Write Protect Mode. If so, control passes to step 138 where the write protect flag is set. Next, at step 140, the second code and password, if any, are written to the first and second predetermined locations on the storage medium, respectively, in place of the first code and its associated password, if any. At this point, the change from the first protection mode to the new, or second protection mode has been effected. Control will then pass back to step 114.

If, however, it is determined at step 130 that the second code does not represent either the Write Protect Mode or the Password Write Protect Mode, then control passes to step 132 where it is determined whether the second code has the value representing the Read/Write Protect Mode. If so, control will pass successively to steps 136 and 138 where both the read and write protect flags will be set. Control will then pass to step 140 where the new, or second code, and any associated password are written to the first and second predetermined locations on the storage medium, respectively, in place of the first code and its associated password, if any. At this point, the change from the first protection mode to the second protection mode has been effected. Control will then pass back to step 114.

If it is determined at step 132 that the second code does not represent the Read/Write Protect Mode, then the disk drive assumes that an erroneous code value was sent. Control will therefore pass to step 134 where an error will be reported to the host computer. After reporting the error, control will pass back to step 114. No change in the protection mode of the storage medium will have been effected.

Finally, if back at step 128, it is determined that the code value of the protection mode command (i.e., the new or second code) is the code for the Temporary Unlock Command, control passes to step 142 where both the read and write protect flags are reset. This effectively unlocks any read or write protection afforded by the current protection mode. Control will then pass back to step 114. Step 140 will have been by-passed, and therefore, the first code and its associated password, if any, are not overwritten or destroyed writing and reading of information to and from the storage medium will, however, no longer be inhibited. The disk drive 40 will operate in this Temporary Unlock Mode until either the disk cartridge is removed, or another protection mode command is sent to again change or reestablish the first, or current protection mode within the drive.

As the foregoing illustrates, the present invention is directed to a method for inhibiting the writing and reading of information to and from a storage medium without the need for mechanical, electrical or other types of switches used in prior art write protect schemes. Additionally, both read and write protection may be password protected to prevent unauthorized changes in protection mode. Since the write and read protection functions, including password comparison are accomplished by the microprocessor inside the drive, rather than by the operating system of a host computer, they are more resistant to tampering. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A removable disk cartridge comprising an outer casing devoid of a mechanical write protect switch and a storage medium disposed within said outer casing, said storage medium having a code stored thereon that indicates a protection mode of said storage medium, the code being rewritable so that the protection mode of the storage medium can be changed; wherein said rewritable protection code is written in only a small, predefined number of tracks on said storage medium yet defines the protection mode of a comparatively larger number of data tracks in which said protection code is not written, whereby the protection mode of all of said larger number of data tracks in which said protection code is not written is definable by way of said protection code written in said small number of tracks.

2. The disk cartridge recited in claim 1 wherein a password is written on the storage medium, the password being associated with the code, whereby a disk drive cannot rewrite the code unless a password received by the disk drive matches the password.

3. The disk cartridge recited in claim 1 wherein the protection mode indicated by the code comprises one of a protection mode wherein writing of information to the storage medium is inhibited, a protection mode wherein writing and reading of information to and from the storage medium are not inhibited, and a protection mode wherein both writing and reading of information to and from the storage medium are inhibited.

4. The disk cartridge recited in claim 1 wherein the rewritable code is written at a plurality of positions on said storage medium.

5. The disk cartridge recited in claim 1 wherein the rewritable code is written at different locations in opposite surfaces of said storage medium.

6. The disk cartridge recited in claim 1 wherein the rewritable code is written on at least one track on said storage medium that is not accessible by a host computer interfaced to said disk drive.

7. The disk cartridge recited in claim 1 wherein said storage medium comprises one of a magnetic storage medium, a rewritable optical storage medium and a magneto-optical storage medium.

8. A disk cartridge as recited in any one of claims 1, 2, 3, 4, 5, 6, or 7, wherein said cartridge further comprises a hub rotatably mounted in said casing, wherein said storage medium is affixed to said hub; means for providing access to said hub to a disk drive; and a head access opening in a front peripheral edge of said casing for providing access to said storage medium to read/write heads of the disk drive.

9. A disk cartridge as recited in claim 8, wherein the cartridge is accessible by a disk drive, when inserted therein, comprising a microprocessor and memory containing software for controlling access to said storage medium, wherein said software is programmed to prevent a user from changing said code, indicating the protection mode of the storage medium, unless the user enters a correct password.

10. A disk cartridge as recited in claim 9, wherein said head access opening is formed in a front peripheral edge of said casing.

11. A disk cartridge as recited in claim 10, further comprising a shutter slidably mounted to said casing so as to cover said head access opening when said disk cartridge is not inserted in said drive.

12. A disk cartridge as recited in claim 11, wherein said casing further comprises a rear peripheral edge opposite said front peripheral edge; a top surface and a bottom surface; and grooves formed in at least one of said top and bottom surfaces adjacent said rear peripheral edge.

13. A disk cartridge as recited in claim 12, wherein said casing comprises upper and lower shells that mate to form the casing.

14. A disk cartridge as recited in claim 1, wherein said cartridge is adapted for use in a disk drive of the type adapted for electronic communication with a host computer to provide the host computer with controlled access to data stored on the storage medium, said disk cartridge further comprising:
 a prescribed number of accessible concentric tracks disposed on a first prescribed portion of said storage medium; and
 an inaccessible concentric track disposed on a second prescribed portion of said storage medium, said inaccessible concentric track comprising a write/read protect sector containing said rewritable protection code, said code being indicative of one of a predefined set of protection modes of said disk cartridge;
 wherein said accessible tracks are controllably accessible to said host through said disk drive, depending on which of said protection modes is indicated by said protection code, and said inaccessible track is inaccessible to said host computer regardless of the protection mode indicated by said protection code.

15. A disk cartridge as recited in claim 14, wherein said first prescribed number of accessible tracks is approximately 1800.

16. A disk cartridge as recited in claim 14, wherein there are a second prescribed number of inaccessible tracks, said second prescribed number being greater than one.

17. A disk cartridge as recited in claim 16, wherein said storage medium comprises two planar surfaces each of which is capable of storing magnetically recorded data, wherein said second prescribed number of inaccessible tracks is four, and wherein there are two inaccessible tracks disposed on each of said planar surfaces.

18. A disk cartridge as recited in claim 17, wherein said second prescribed portion is situated radially outside of said first prescribed portion.

19. A disk cartridge as recited in claim 17, wherein said second prescribed portion is situated radially inside of said first prescribed portion.

20. A disk cartridge as recited in claim 17, wherein said second prescribed portion comprises a first sub-portion situated radially inside of said accessible tracks and a second sub-portion situated radially outside of said accessible tracks, wherein at least one inaccessible track is disposed on each of said sub-portions.

21. A disk cartridge as recited in claim 14, wherein said inaccessible track includes at least one write/read protect sector comprising an ID field and a data field, said ID field containing identification information distinguishing the write/read protect sector from other sectors in said inaccessible track, and said data field comprising a predefined number of data bytes.

22. A disk cartridge as recited in claim 21, wherein said predefined number of data bytes is 512.

23. A disk cartridge as recited in claim 22, wherein a first portion of said data field stores said protection code to indicate a current protection mode of the cartridge.

24. A disk cartridge as recited in claim 23, wherein a second portion of said data field stores a password.

25. A disk cartridge as recited in claim 24, wherein said password has a predefinable length and the data field comprises the following arrangement of sub-fields:

| | |
|---|---|
| Byte #1 | protection code; |
| Byte #2 | password length; |
| Byte #3–34 | password; |
| Byte #34–511 | unused. |

26. A method for setting a protection mode of a removable disk cartridge of the type that is received by a disk drive, said disk drive being in communication with a host computer and being responsive to a protection code stored on said storage medium to inhibit host access to said storage medium in accordance with a current protection mode indicated by said code, comprising the steps of:
 (a) providing a removable disk cartridge comprising an outer casing devoid of a mechanical write protect switch and a storage medium disposed in said outer casing and having a code stored thereon that indicates a current protection mode of said storage medium, the code being rewritable so that the protection mode of the storage medium can be changed, wherein said rewritable protection code is written in only a small, predefined number of tracks on said storage medium yet defines the protection mode of a comparatively larger number of data tracks in which said protection code is not written, whereby the current protection mode of all of said larger number of data tracks in which said protection code is not written is definable by way of said protection code written in said small number of tracks;
 (b) receiving a command to change the protection mode of said storage medium from said current protection mode to a different protection mode; and, in response to the command,
 (c) writing in said predetermined location on the storage medium, in place of the current code, a different code indicative of the different protection mode, said different protection mode and different code becoming said current protection mode and current code; and (d) repeating steps (b) and (c) whenever it is desired again to change the protection mode of the storage medium.

27. A method as recited in claim 26, wherein said removable cartridge is adapted for use in a disk drive of the type adapted for electronic communication with a host computer to provide the host computer with controlled access to data stored on the storage medium, said removable disk cartridge further comprising:

a prescribed number of accessible concentric tracks disposed on a first prescribed portion of said storage medium; and an inaccessible concentric track disposed on a second prescribed portion of said storage medium, said inaccessible concentric track comprising a write/read protect sector containing said rewritable protection code, said code being indicative of one of a predefined set of protection modes of said disk cartridge;

wherein said accessible tracks are controllably accessible to said host through said disk drive, depending on which of said protection modes is indicated by said protection code, and said inaccessible track is inaccessible to said host computer regardless of the protection mode indicated by said protection code.

28. A method as recited in claim 27, wherein said first prescribed number of accessible tracks is approximately 1800.

29. A method as recited in claim 27, wherein there are a second prescribed number of inaccessible tracks, said second prescribed number being greater than one.

30. A method as recited in claim 29, wherein said storage medium comprises two planar surfaces each of which is capable of storing magnetically recorded data, wherein said second prescribed number of inaccessible tracks is four, and wherein there are two inaccessible tracks disposed on each of said planar surfaces.

31. A method as recited in claim 30, wherein said second prescribed portion is situated radially outside of said first prescribed portion.

32. A method as recited in claim 30, wherein said second prescribed portion is situated radially inside of said first prescribed portion.

33. A method as recited in claim 30, wherein said second prescribed portion comprises a first sub-portion situated radially inside of said accessible tracks and a second sub-portion situated radially outside of said accessible tracks, wherein at least one inaccessible track is disposed on each of said sub-portions.

34. A method as recited in claim 27, wherein said inaccessible track includes at least one write/read protect sector comprising an ID field and a data field, said ID field containing identification information distinguishing the write/read protect sector from other sectors in said inaccessible track, and said data field comprising a predefined number of data bytes.

35. A method as recited in claim 34, wherein said predefined number of data bytes is 512.

36. A method as recited in claim 35, wherein a first portion of said data field stores said protection code to indicate a current protection mode of the cartridge.

37. A method as recited in claim 36, wherein a second portion of said data field stores a password.

* * * * *